US010915820B2

(12) United States Patent
Lecue et al.

(10) Patent No.: US 10,915,820 B2
(45) Date of Patent: Feb. 9, 2021

(54) GENERATING DATA ASSOCIATED WITH UNDERREPRESENTED DATA BASED ON A RECEIVED DATA INPUT

(71) Applicant: Accenture Global Solutions Limited, Dublin (IE)

(72) Inventors: Freddy Lecue, Castleknock (IE); Md Faisal Zaman, Drumcondra (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/059,399

(22) Filed: Aug. 9, 2018

(65) Prior Publication Data

US 2020/0050946 A1    Feb. 13, 2020

(51) Int. Cl.
*G06N 5/02*         (2006.01)
*G06N 20/00*        (2019.01)
*G06F 16/901*       (2019.01)
*G06K 9/62*         (2006.01)

(52) U.S. Cl.
CPC ........... *G06N 5/02* (2013.01); *G06F 16/9024* (2019.01); *G06K 9/6215* (2013.01); *G06N 20/00* (2019.01)

(58) Field of Classification Search
CPC .......... G06N 5/02; G06N 5/04; G06N 99/005; G06N 20/00; G06K 9/6215; G06F 17/30958; G06F 16/9024
USPC ......................................................... 706/46
See application file for complete search history.

(56) References Cited

U.S. PATENT DOCUMENTS

| 2016/0092557 | A1 | 3/2016 | Stojanovic et al. |
| 2016/0103932 | A1* | 4/2016 | Sathish .............. G06F 17/30705 715/767 |
| 2016/0314184 | A1* | 10/2016 | Bendersky .............. G06F 16/35 |
| 2016/0371393 | A1* | 12/2016 | Allen ................. G06F 17/30598 |
| 2017/0293698 | A1* | 10/2017 | Abebe ............... G06F 17/30958 |

(Continued)

FOREIGN PATENT DOCUMENTS

| EP | 3358472 A1 | 8/2018 |
| JP | 2017536601 A | 12/2017 |

OTHER PUBLICATIONS

Extended European Search Report for Application No. EP19190634.6, dated Jan. 10, 2020, 10 pages.

*Primary Examiner* — Ann J Lo
*Assistant Examiner* — Oluwatosin O Alabi
(74) *Attorney, Agent, or Firm* — Harrity & Harrity, LLP

(57) ABSTRACT

An example method described herein involves receiving a data input; identifying a plurality of topics in the data input; determining an underrepresented set of data for a first set of topics of the plurality of topics based on a plurality of knowledge graphs associated with the first set of topics; calculating a score for each topic of the first set of topics based on a representative learning technique; determining that the score for a first topic of the first set of topics satisfies a threshold score; selecting a topic specific knowledge graph based on the first topic; identifying representative objects that are similar to objects of the data input based on the topic specific knowledge graph; generating representation data that is similar to the data input based on the representative objects to balance the underrepresented set of data with a set of data associated with a second set of topics of the plurality of topics; and performing an action associated with the representation data.

20 Claims, 10 Drawing Sheets

(56) References Cited

U.S. PATENT DOCUMENTS

| | | | |
|---|---|---|---|
| 2017/0308792 A1* | 10/2017 | Liang | G06N 20/00 |
| 2018/0039620 A1* | 2/2018 | Ciulla | G06F 17/2785 |
| 2018/0039696 A1 | 2/2018 | Zhai et al. | |
| 2018/0121539 A1* | 5/2018 | Ciulla | G06F 17/30734 |
| 2018/0218075 A1* | 8/2018 | James | G06F 7/24 |

* cited by examiner

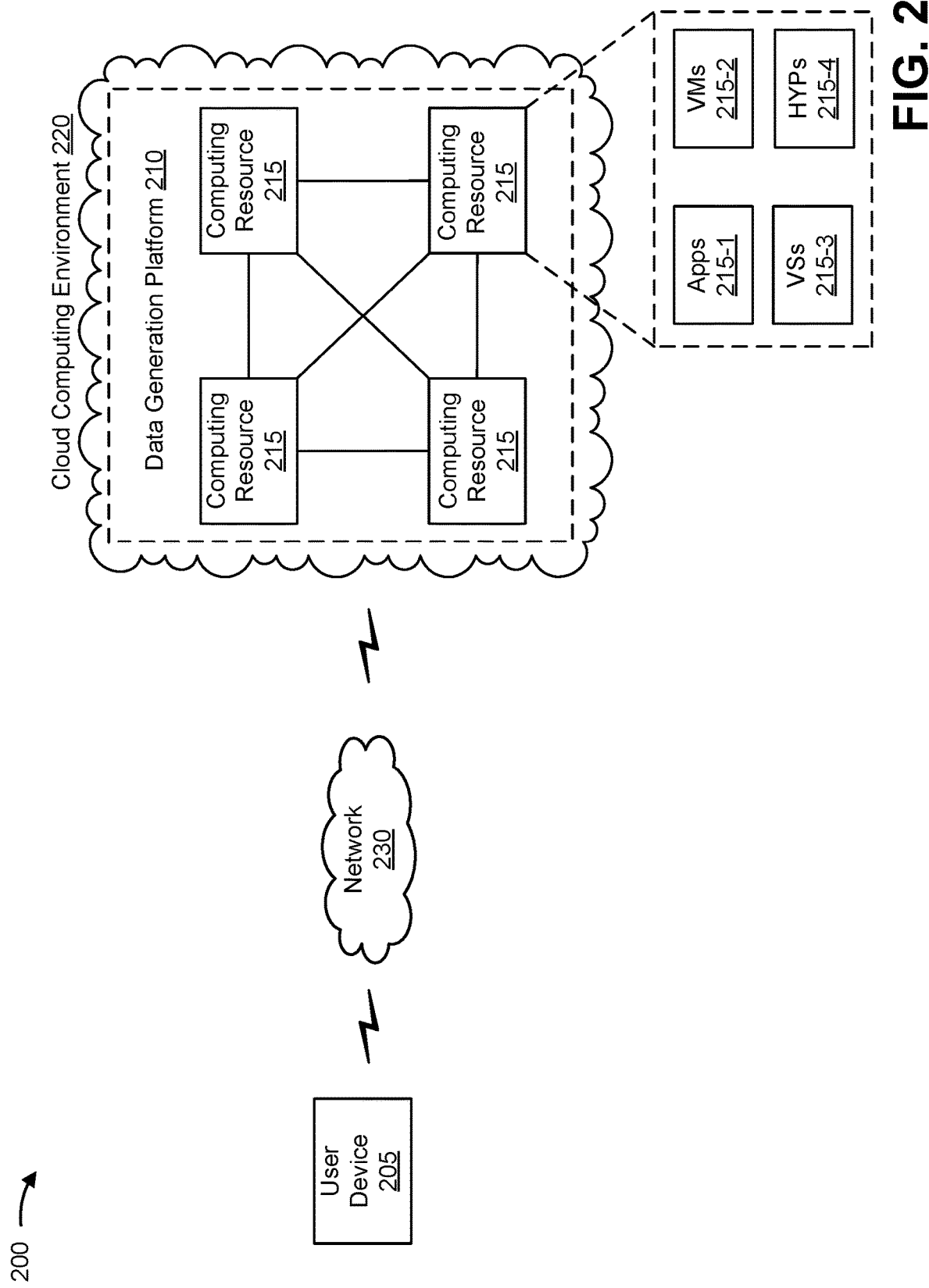

GENERATING DATA ASSOCIATED WITH UNDERREPRESENTED DATA BASED ON A RECEIVED DATA INPUT

BACKGROUND

A knowledge graph may be used to represent, name, and/or define a particular category, property, or relation between classes, topics, data, and/or entities of a domain. A knowledge graph may include nodes that represent the classes, topics, data, and/or entities of a domain and edges linking the nodes that represent a relationship between the classes, topics, data, and/or entities of the domain. Knowledge graphs may be used in classification systems, machine learning, computing, and/or the like.

SUMMARY

According to some implementations, a method may include receiving, a data input; receiving a domain knowledge graph associated with objects of the data input; identifying a plurality of topics in the data input based on the domain knowledge graph; determining a represented set of data for a first set of topics of the plurality of topics; determining an underrepresented set of data for a second set of topics of the plurality of topics; calculating a score for each topic of the plurality of topics; determining that the score for a first topic of the plurality of topics satisfies a threshold score; determining that the first topic of the plurality of topics is one topic of the second set of topics; selecting a topic specific knowledge graph based on the first topic; identifying objects of the data input on the topic specific knowledge graph; identifying representative objects that have a threshold level of similarity with the objects of the data input based on the topic specific knowledge graph; generating representation data that is of a similar data type to the data input based on the representative objects; and/or performing an action associated with the representation data.

According to some implementations, a device may include one or more memories; and one or more processors, communicatively coupled to the one or more memories, to: receive a data input; identify a plurality of topics in the data input; determine an underrepresented set of data for a first set of topics of the plurality of topics based on a plurality of knowledge graphs associated with the first set of topics; calculate a score for each topic of the first set of topics based on a representative learning technique; determine that the score for a first topic of the first set of topics satisfies a threshold score; select a topic specific knowledge graph based on the first topic; identify representative objects that are similar to objects of the data input based on the topic specific knowledge graph; generate representation data that is similar to the data input based on the representative objects to balance the underrepresented set of data with a set of data associated with a second set of topics of the plurality of topics; and perform an action associated with the representation data.

According to some implementations, a non-transitory computer-readable medium may store instructions that, when executed by one or more processors, cause the one or more processors to: receive a data input; determine a represented set of data for a first set of topics of a plurality of topics of the data input based on a domain knowledge graph of the plurality of topics; determine an underrepresented set of data for a second set of topics of the plurality of topics based on a representative learning technique, wherein the underrepresented set of data is underrepresented relative to the represented set of data; calculate a score for each topic of the plurality of topics based on the representative learning technique; determine that the score for a first topic of the plurality of topics satisfies a threshold score; determine that the first topic of the plurality of topics is one of the second set of topics; select a topic specific knowledge graph based on the first topic being one of the second set of topics; identify representative objects that are similar to objects of the data input based on the topic specific knowledge graph; generate representation data that is similar to the data input based on the representative objects by substituting one of the representative objects with a corresponding object of the data input according to the topic specific knowledge graph and the domain knowledge graph; generate a representation knowledge graph based on the representation data, wherein the representation knowledge graph includes a new topic that is associated with the underrepresented set of data; and store the representation knowledge graph in a knowledge graph data structure, wherein the knowledge graph data structure stores the domain knowledge graph and the topic specific knowledge graph.

BRIEF DESCRIPTION OF THE DRAWINGS

FIG. 2 is a diagram of an example environment in which systems and/or methods, described herein, may be implemented.

DETAILED DESCRIPTION

Figure 1A:
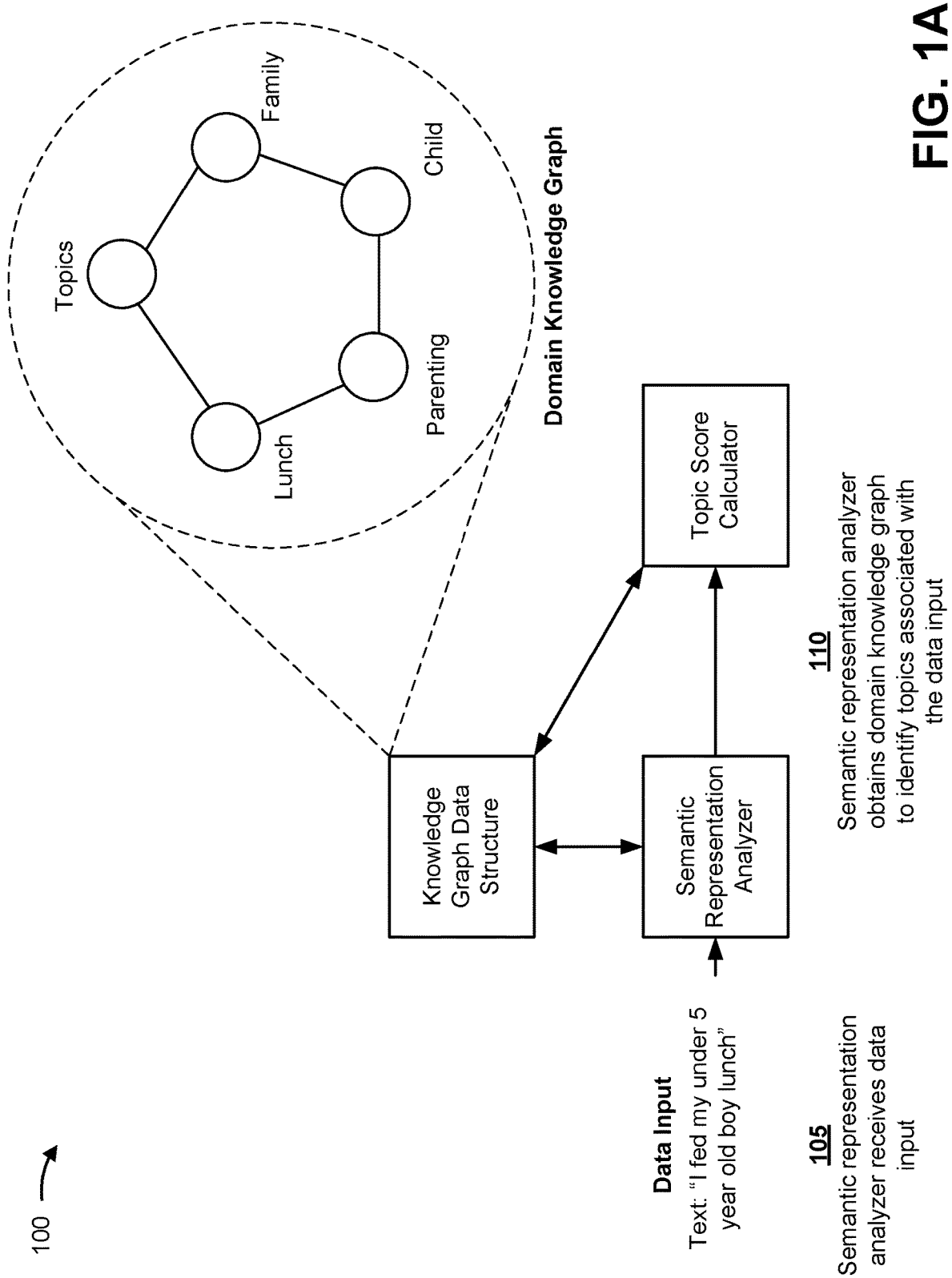
FIGS. 1A-1D are diagrams of an example implementation described herein.

The following detailed description of example implementations refers to the accompanying drawings. The same reference numbers in different drawings may identify the same or similar elements.

Object recognition within data (e.g., text data, image data, video data, audio data, and/or the like) may depend on reference data sets that are used to identify the objects within the data. Some objects that may be recognized in data may include words, phrases, sentences, topics, people, places, sounds, actions, and/or the like. Systems may receive unstructured data (e.g., a streams and/or document that includes text, images, video, audio, and/or the like), recognize objects in the unstructured data, analyze the recognized objects in the unstructured data, and generate structured data (e.g., reports, classifications, and/or the like) associated with a topic (e.g., a person, place, thing, event, and/or the like) of the unstructured data.

In some instances, some reference data sets may not include suitable amounts of data in one or more areas (e.g., groups of similar objects) to accurately detect objects and/or determine meaningful information from identified objects associated with one or more topics. For example, there may be multiple, different phrases that may be used to refer to a same topic. As another example, there may be multiple different images that include a same topic (e.g., a same person, place, or thing). Accordingly, if a data input, that is associated with a particular topic, is received, but a data set for the topic is underrepresented relative to other data sets (and/or non-existent), the probability that the topic is accurately identified is decreased. Therefore, one or more systems that uses text analysis, speech recognition, image recognition, and/or the like (e.g., machine learning systems, data classification systems, and/or the like) may be unable to accurately detect and/or analyze a topic associated with a data input.

Some implementations, as described herein, enable a data generation platform to balance underrepresented data sets with other data sets of a reference data structure. For example, in some implementations, a data input may be received, a plurality of topics associated with the data input can be identified from objects of the data input, and a topic of the plurality of topics that is underrepresented can be balanced. According to some implementations, the topic that is underrepresented can be balanced (e.g., relative to other topics) by identifying similar objects (e.g., semantically similar objects) and/or similar sets of data (e.g., semantically similar data sets of data) and generating examples associated with the underrepresented topic from the similar objects. In some implementations, one or more knowledge graphs may be used and/or generated to identify underrepresented data sets and/or generate data sets for the underrepresented data sets. In this way, the data generation platform may identify one or more underrepresented data sets and generate data associated with the underrepresented data sets (e.g., similar data, adversarial data, and/or the like) to increase an amount of data in the underrepresented data sets, and thus increase an ability to identify one or more topics of the previously underrepresented data sets using the increased amount of data.

In this way, some implementations described herein may conserve processor resources and/or memory resources that would otherwise be spent attempting to process or identify topics in unstructured data using previous techniques. Furthermore, some implementations described herein can conserve processor resources and/or memory resources associated with correcting object detections and/or data analyses that were inaccurate as a result of using underrepresented data sets for topics of the data input. In this way, several different stages of a process for analyzing data inputs are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to generate data for an underrepresented data set corresponding to a topic of the data input using the data input and/or one or more knowledge graphs. Finally, automating the process for generating representative data with a particular topic associated with an underrepresented topic conserves computing resources (e.g., processor resources, memory resources, and/or the like) that would otherwise be wasted in attempting to detect the topic in subsequent data input, and computing resources of the user device that would be wasted by being unable to accurately detect the topic without the generated representative data.

FIGS. 1A-1D are diagrams of an example implementation 100 described herein. In example implementation 100, data associated with underrepresented data sets may be generated using a received data input. Example implementation 100 may be associated with and/or implemented via a data generation platform configured to generate representation data for underrepresented data sets. As further described herein, in example implementation 100, the received data input may be analyzed using a knowledge graph to identify topics of the data input, the topics are analyzed to determine whether one or more of the topics are underrepresented (e.g., relative to one another and/or relative to a data structure that includes the topics), and data is generated for the underrepresented topics using knowledge graphs associated with the identified objects of the data input. Accordingly, in example implementation 100, underrepresented data sets can be identified based on a data input and data can be generated for the underrepresented data sets using the data input and knowledge graphs associated with objects of the data input. Therefore, an increased number of data sets can be included within a data structure to enable enhanced accuracy in identifying information associated with data inputs for one or more purposes (e.g., machine learning, data classification, and/or the like).

As shown in FIG. 1A, and by reference number 105, a semantic representation analyzer receives a data input. As shown in FIG. 1A, the semantic representation analyzer may be a part of a platform (e.g., a data generation platform) that is configured to generate data associated with underrepresented data sets, as described herein.

In some implementations, the data input may be text data, image data, audio data, video data, and/or the like. The data input may be received from one or more sources (e.g., computing devices, user interfaces, microphones, image capturing devices, sensor devices, network devices, and/or the like). In some implementations, a data generation platform, including the semantic representation analyzer, may be configured to monitor the one or more sources to receive the data input. For example, the data generation platform may be configured to monitor hundreds of sources, thousands of sources, millions of sources, simultaneously, such that it would not be possible for a human to receive, process, and/or analyze the data input, in real time, as described herein. Accordingly, the data generation platform may balance underrepresented data sets to build a data structure (e.g., a database, a table, a graph, and/or the like) of topics, subjects, and/or the like that can be used to accurately recognize, analyze, classify, and/or utilize received data inputs. Additionally, or alternatively, the data generation platform may subscribe to receive the data input from the one or more sources.

As shown, the data input is a text input ("I fed my under 5 year old boy lunch"). In some implementations, the data input may be converted and/or may have been converted from a different type of data (e.g., from audio data using speech to text, from image data using optical character recognition, and/or the like).

As further shown in FIG. 1A, and by reference number 110, the semantic representation analyzer obtains a domain knowledge graph to identify topics associated with the data input. The domain knowledge graph may include a knowledge graph of known or recorded topics of a particular domain, with each topic being a node on the domain knowledge graph, and edges (links) between the topics corresponding to relationships between the respective topics. The domain knowledge graph may be stored in a knowledge graph data structure. The knowledge graph data structure may include a database, a table, an index, a task graph, and/or the like that is capable of storing the domain knowledge graph.

In some implementations, the semantic representation analyzer may use a representative learning technique (e.g., feature learning and/or machine learning) to identify topics associated with the data input based on objects identified in the data input. Using the representative learning technique, the semantic representation analyzer may parse the received data input to identify objects of the data input. For example, the semantic representation analyzer may separate text data into words and/or phrases, separate image data into identified features or objects of the images, separate audio data into particular sounds or audio signals, and/or the like. Accordingly, the semantic representation analyzer may parse the received data input into the words (or objects): I, fed, my, under, 5, year, old, boy, lunch. As such, from the parsed data input, the semantic representation analyzer may reference the knowledge graph data structure to identify whether any objects (or combination of objects) of the parsed data are included within and/or associated with topics of the knowledge graph data structure.

According to some implementations, the data input may be encoded to identify the objects of the data input. For example, a vector may be generated for objects of the data input. The semantic representation analyzer may generate the vector of the data input based on the domain knowledge graph. For example, for text data, if a word or phrase of the data input matches a word or phrase in the domain knowledge graph, a corresponding value (e.g., represented by a binary number) for the word in the domain knowledge graph can be used in the encoded data input. Accordingly, the semantic representation analyzer may encode the data input to generate a vector of 1s and 0s. As such, the vector may be a binary number that can be used to simplify processing and/or analyzing the data input according to implementations described herein, thereby conserving computing resources of the data generation platform.

In FIG. 1A, a portion of the domain knowledge graph that is associated with the data input "I fed my under 5 year old boy lunch" is shown. The domain knowledge graph may include many (e.g., hundreds, thousands, millions, billions, or more) of nodes other than what is shown. In example implementation 100, a family node, a child node, a parenting node, and a lunch node from the domain knowledge graph are shown as relevant topics associated with the data input. As shown, the child node is associated with the family node (e.g., because a child may be a part of a family), the child node is linked to the family node and the parenting node (e.g., because parenting involves raising a child), and the parenting node is linked to the child node and the lunch node (e.g., because parenting involves providing lunch).

The semantic representation analyzer may provide or forward the data input to a topic score calculator to determine a similarity between objects and/or topics of the data input and topics of the domain knowledge graph. The example topic score calculator may be a part of and/or associated with the data generation platform, as described herein.

Figure 1B:
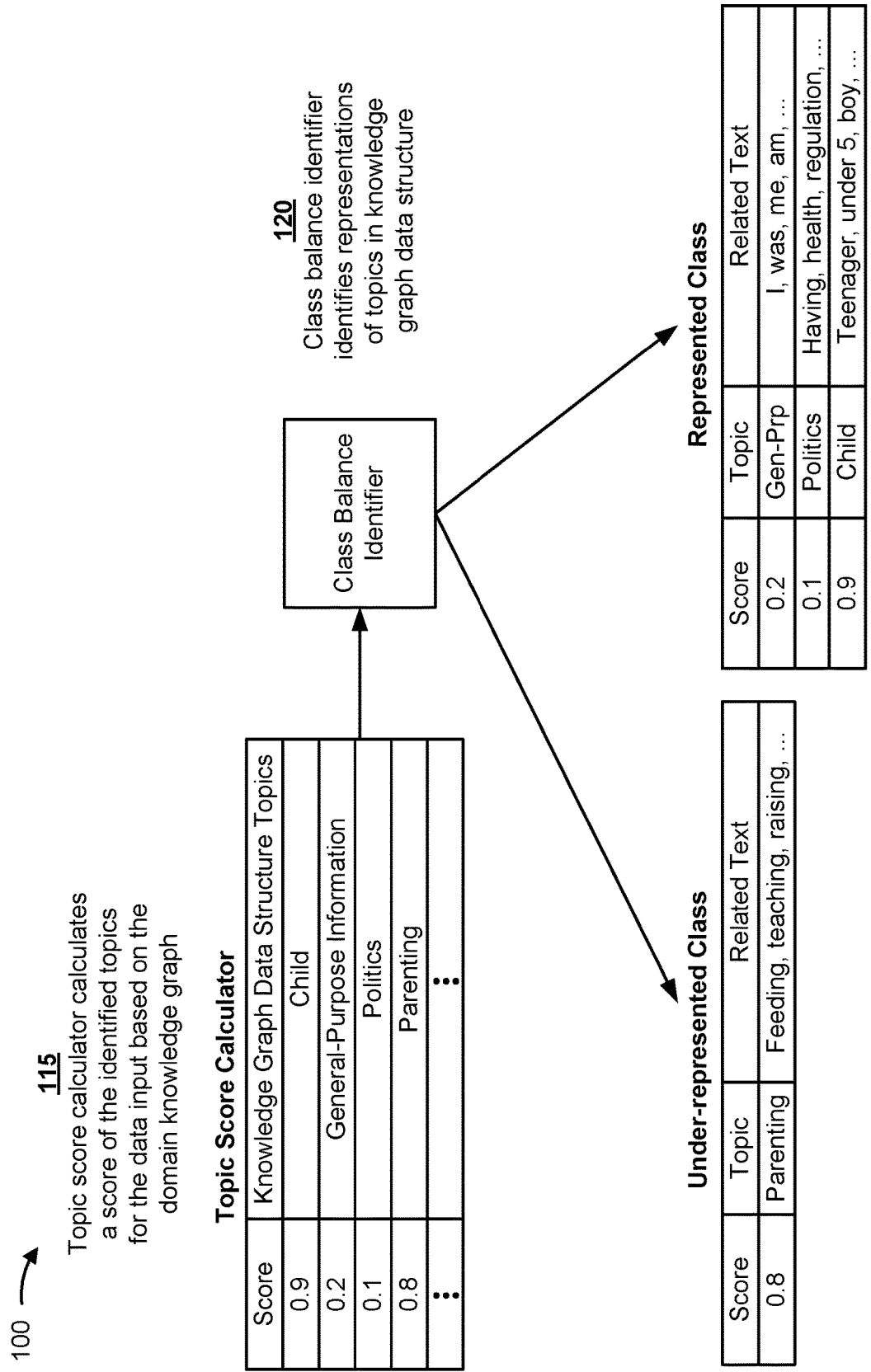

As shown in FIG. 1B, and by reference number 115, the topic score calculator calculates a score for the data input based on the domain knowledge graph. The topic score calculator may calculate scores for topics of the knowledge graph data structure using the data input and the domain knowledge graph to identify a confidence that the topics of the reference data structure are associated with the data input.

The topic score calculator may use any suitable scoring technique to determine whether topics of the domain knowledge graph are related to a topic of the data input. For example, the topic score calculator may use a representative learning technique (e.g., a semantic similarity technique) to determine whether the topics of the domain knowledge graph are the same or similar to the topics of the data input. In some implementations, the topic score calculator may determine that a topic of the data input corresponds to a topic of the domain knowledge graph based on the topic of the data input being the same or being semantically similar (e.g., are synonyms according to the domain knowledge graph) to the topic of the domain knowledge graph. In some implementations, whether the topic is the same, similar, and/or unrelated (or different) may depend on the distance between the topic identified in the data input and the topic in the domain knowledge graph. Accordingly, a topic score for a topic of the domain knowledge graph may correspond to the number of edges that are between topics of the data input and the domain knowledge graph. In some implementations, values corresponding to distances between a topic of the domain knowledge graph and identified topics of the data input within the domain knowledge graph may be combined, weighted, and/or the like to determine a topic score for that topic of the domain knowledge graph.

In some implementations, topic scores may be calculated for all topics of the domain knowledge graph. Additionally, or alternatively, a threshold number of topic scores may be calculated for a threshold number of the domain knowledge graph topics based on a distance between the topics of the domain knowledge graph and the topics of the data input. For example, if a topic of a domain knowledge graph is more than a threshold number of edges (e.g., three edges, four edges, five edges, and/or the like) from any topic identified in the data input, topic scores may not be calculated for those topics of the domain knowledge graph, which conserves computing resources of the data generation platform.

As an example, topic score calculator may use a relative and/or weighted scoring technique such that a score of "1.0" indicates a same topic and a score of "0.0" indicates an unrelated topic. As shown in the example of FIG. 1B, child may score a 0.9 (e.g., based on "under 5 year old boy" in the data input), general-purpose information may score a 0.2 (e.g., based on common words, such as "1" and "my" in the data input being included but not a topic of the data input), politics may score a 0.1 (e.g., based on being somewhat related to "family" but not being related to a topic of the data input), and parenting may score a 0.8 (e.g., based on "my under 5 year old boy").

The topic score calculator may provide scores associated with topics of the domain knowledge graph to a class balance identifier that may identify which topics associated with the data input are underrepresented (e.g., relative to one another and/or relative to the topics of the domain knowledge graph). The example class balance identifier may be part of and/or associated with the data generation platform, as described herein. In some implementations, the topic score calculator may only provide topic scores for topics that satisfy a particular threshold (e.g., greater than "0.0") to the class balance identifier. Accordingly, the topic score calculator may conserve computing resources that may otherwise be used to process data for topics that score below the particular threshold.

As further shown in FIG. 1B, and by reference number 120, the class balance identifier identifies representations of topics in a knowledge graph data structure. As used herein, a representation of a topic may be determined based on an amount of data that is received, available, and/or associated with a particular topic. In some implementations, the class balance identifier may determine the representation of the topic based on the amount of data included in the domain knowledge graph for the particular topic. Accordingly, the class balance identifier may determine whether a topic is underrepresented based on the amount of nodes and/or edges in the domain knowledge graph that are associated with that particular topic.

According to some implementations, a representative learning technique may be used to determine whether a set of data (associated with a topic) is underrepresented relative to another set of data. For example, the class balance identifier may compare the topics of the data input and/or topics related to the data input (e.g., those topics within a certain edge distance of the topics of the data input) to each other. Accordingly, the class balance identifier may use the representative learning technique to identify which topic (and corresponding set of data) is underrepresented relative to another topic and/or relative to a plurality of other topics.

As shown in the example of FIG. 1B, the class balance identifier may determine that the parenting topic is underrepresented relative to general-purpose information (shown as GenPrp), politics, and child topics. For example, the class balance identifier may determine that the parenting topic is associated with a threshold percentage (or less) amount of data as one or more of the general-purpose information, politics, and child topics. Accordingly, an underrepresented topic may be underrepresented relative to a represented topic based on an amount of data associated with the underrepresented data satisfying a threshold percentage (e.g., less than 10%, less than 20%, less than 30%, and/or the like) of the amount of data of the represented topic.

The class balance identifier may provide the underrepresented topic to a representation threshold analyzer to determine which topics are to be balanced by generating representation data associated with the data input. The representation threshold analyzer may be a part of and/or associated with the data generation platform, as described herein.

Figure 1C:
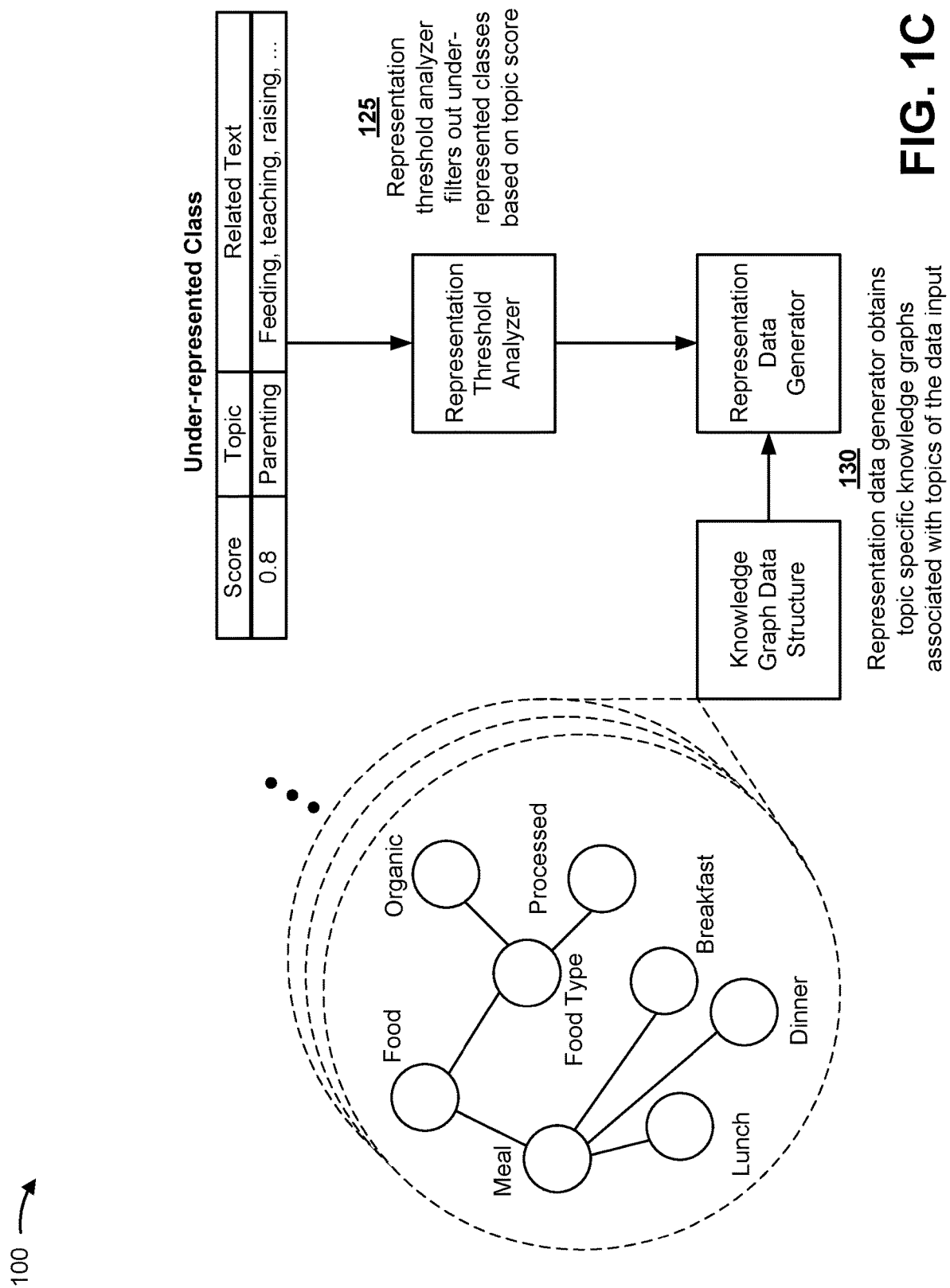

As shown in FIG. 1C, and by reference number 125, a representation threshold analyzer may filter underrepresented topics based on the topic score to ensure that underrepresented data sets that are to be addressed are associated with topics of the data input. For example, if the representation threshold analyzer determines that the underrepresented topic is associated with a topic that is not related to the data input (as represented by the topic score), the representation threshold analyzer may disregard that underrepresented topic because the data generation platform may not be able to accurately generate representation data for that topic using the data input (e.g., because the topic is not related to the data input).

As shown in FIG. 1C, the topic score for the underrepresented class (set of data) of parenting is 0.8. Assuming a threshold score of 0.8, the representation threshold analyzer may allow data that is associated with the underrepresented class to be generated. On the other hand, if the topic score for parenting was less than 0.8 (or if another topic, such as politics, was determined to be an underrepresented topic), the representation threshold analyzer may not allow data to be generated for parenting, and the data generation platform may move onto processing and/or analyzing another data input. Accordingly, the representation threshold analyzer may conserve resources that may otherwise be used to attempt to generate representation data for a topic that is not associated with the data input.

The representation threshold analyzer may provide the filtered underrepresented class or classes to a representation data generator. The representation data generation may be apart of and/or associated with the data generation platform, as described herein. In some implementations, the representation data generator may generate representation data for the underrepresented classes that are associated with the data input, rather than a class that is not associated with the data input because attempting to generate representation data using information from the data input may not generate accurate representation data. Accordingly, it would be a waste of processor resources and/or memory resources to attempt to generate representation data, using the data input, for topics that are not associated with the data input.

As further shown in FIG. 1C, and by reference number 130, the representation data generator obtains topic specific knowledge graphs associated with topics of the data input. For example, a topic specific knowledge graph for a topic may include a knowledge graph with the topic as a node that is linked to a number of other nodes within a threshold edge distance (e.g., within two edges, three edges, and/or the like). The topic specific knowledge graph may include edges from the topic (the central node) to related topics (e.g., related nodes as indicated by the domain knowledge graph), which may have a distance of one edge from the topic. In some implementations, further related topics (e.g., which may have a distance of more than one edge from the central node) may be obtained and/or used to generate representation data associated with the underrepresented class.

As shown in example implementation 100, a topic specific knowledge graph associated with lunch is identified and/or embedded. As shown according to the topic specific knowledge graph, lunch is related to meal. Meal is related to dinner, breakfast, and food. Food is related to meal and food type, and food type is related to organic and processed. Similar topic specific knowledge graphs for remaining topics of the data input (e.g., parenting, child, and/or family) can be obtained to generate representation data for parenting. Accordingly, as described herein, the representation data generator may use the topic specific knowledge graphs to generate representation data associated with under-represented classes.

According to some implementations, an embedding process of the topic specific knowledge graphs may be performed from the domain knowledge graph. For example, the knowledge graphs may be processed to identify types of edges (relationships) between the nodes (e.g., whether node A is the same as node B, whether node A is a subset of node B, whether node A includes node B, whether node A is related to node B, whether node A has been previously associated with node B, and/or the like). For example, the representation data generator may determine that the edge between food and meal indicates that food "is used during" a meal. Further, the representation data generator may determine that lunch "is a" meal, dinner "is a" meal, breakfast "is a" meal, and so on. Furthermore, the representation data generator may determine characteristics of the objects based on the types of edges. For example, the representation data generator may determine whether the nodes and/or edges can be subjects and/or predicates of sentences. For example, the topic specific knowledge graph for lunch may indicate that "food is used during a meal." In such a case, "food" is a subject, and "is used during" is a predicate, and "a meal" is an object. The embedding process may group subjects, predicates, and/or sentence objects from the topic specific graphs according to the data input (e.g., similarly to an organizational structure of the data input).

Figure 1D:
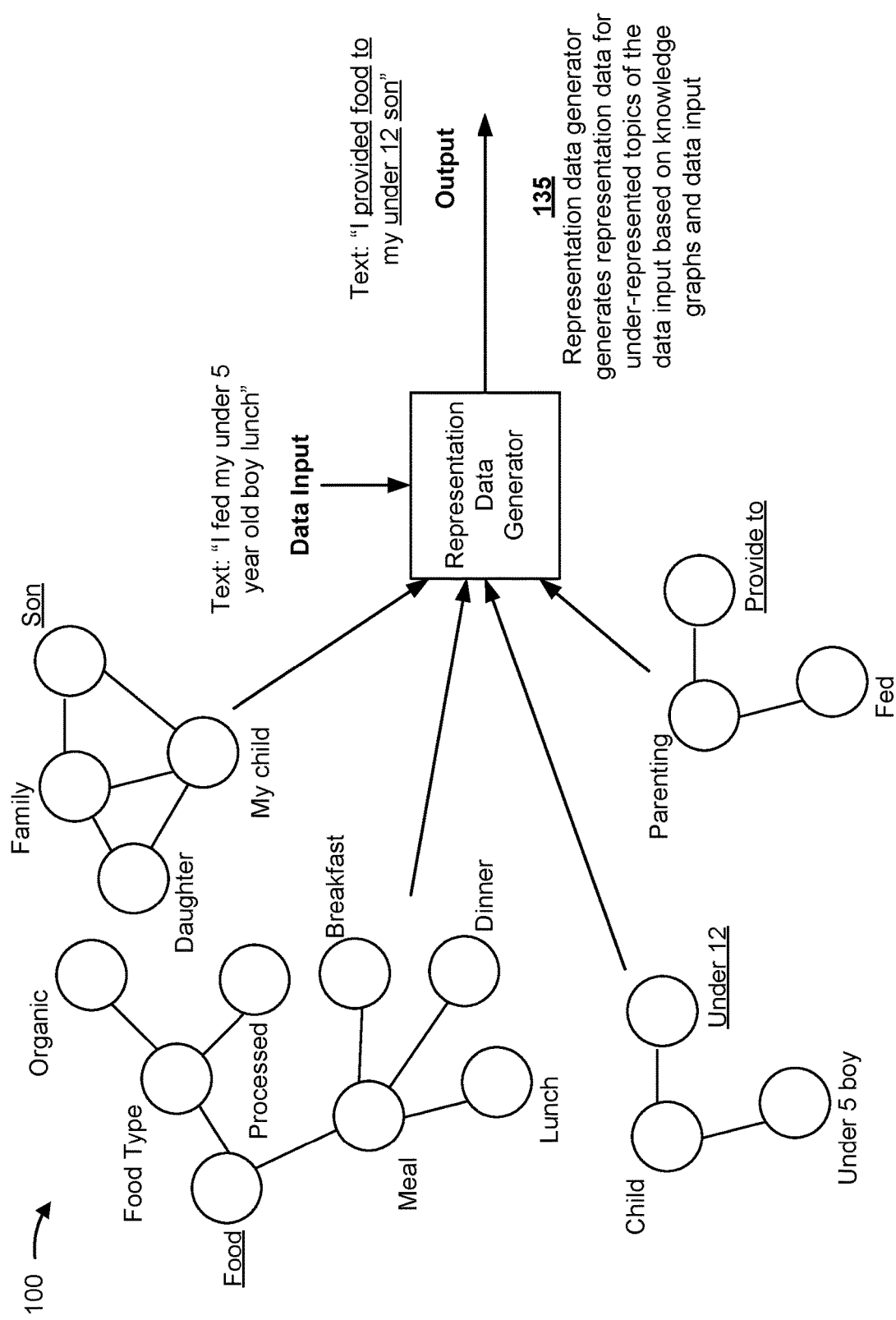

As shown in FIG. 1D, and by reference number 135, the representation data generator generates representation data for the underrepresented topics of the data input based on the knowledge graphs and the data input. According to some implementations, the representation data generator may generate like or similar data as the received data input. Additionally, or alternatively, the representation data generator may generate adversarial and/or opposite data to the received data input (e.g., if the adversarial and/or opposite data is determined to be under-represented).

According to some implementations, the representation data generator may identify representative objects in the topic specific knowledge graphs that have a threshold level of similarity with objects of the data input. For example, the threshold level of similarity may correspond to an edge distance between the representative objects and the objects of the data input in the topic specific knowledge graphs. The representation data generator may map the representative objects to the objects of the data input. For example, the representation data generator may identify characteristics of the identified objects of the data input. For example, in text data, the representation data generator may identify parts of speech associated with the objects (e.g., nouns, verbs, adjectives, adverbs, prepositions, and/or the like), in image data, the representation data generator may identify features (e.g., color, shading, type, and/or the like) of objects identified in the image, and so on. Accordingly, referring to the example of FIG. 1D, the representation data generator may identify that lunch and child (from "under 5 boy") are nouns and that fed is a verb. The representation data generator may map the nouns to the embedding of the topic specific knowledge graph based on an organizational structure of the data input. For text, the organizational structure may correspond to a sentence structure of the text, a format of the text, a layout of an image, and/or the like.

To generate representation data, the representation data generator may substitute at least one of the representative objects with at least one of the objects of the data input. For example, the representation data generator may replace a topic from the data input that is a subject with topics found in the topic specific knowledge graphs (and/or in embeddings of the topic specific knowledge graph) that are also subjects. The representation data generator may substitute corresponding representative objects with objects of the data input based on an edge distance of the representative objects from the objects of the data input in the topic specific knowledge graphs. Accordingly, as shown in the example of FIG. 1D, the representation data generator may generate text data "I provided food to my under 12 son" based on the data input "I fed my under 5 year old boy lunch." In the example of FIG. 1D, provided to is taken from the topic specific knowledge graph for parenting, food is taken from the topic specific knowledge graph for lunch, under 12 is taken from the top specific knowledge graph for child, and son is taken from the topic specific knowledge graph for family. Accordingly, such a phrase and/or corresponding knowledge graph associated with the phrase can be output and/or stored within the knowledge graph data structure. Therefore, if the phrase "I provided food to my under 12 son" was subsequently received by a system (e.g., a classification system, an object recognition system, and/or the like) associated with representation data generator, the system can accurately identify and/or determine that the phrase is associated with parenting.

According to some implementations, the representation data generator may generate a representation knowledge graph based on the generated representation data. For example, the representation data generator may generate a representation knowledge graph for parenting that includes a new topic associated with providing food. In some implementations, the representation knowledge graph may form a new topic based on one or more other topic specific knowledge graphs. As such, if a subsequent data input is received that includes the phrase "provided food to", a system may be able to identify that the subsequent data input is associated with parenting and/or may be associated with feeding, similar to the data input of FIG. 1D. The representation data generator may store the representation knowledge graph in the knowledge graph data structure. For example, the representation data generator may update the domain knowledge graph to include the representation knowledge graph and/or store the representation knowledge graph as a topic specific knowledge graph (e.g., along with the other topic specific knowledge graphs of the knowledge graph data structure). As such, the representation knowledge graph may be used to identify and/or analyze one or more topics of a subsequently received data input.

According to some implementations, the representation data generator may iteratively generate data for an underrepresented set of data until the underrepresented set of data is balanced. As such, the representation data may be included in a represented set of data for a subsequently received set of topics. Additionally, or alternatively, the representation data generator may generate a threshold amount of representation data (or a threshold number of sets of data) to increase the amount of data associated with the underrepresented set of data.

Accordingly, as described herein, the representation data generator may generate representation data that is associated with the data input. Therefore, one or more systems may use the generated representation data in machine learning (e.g., to train a machine learning model, to test a machine learning model, and/or the like), classification (e.g., to train a classification system, to test a classification system, and/or the like), and/or the like when receiving data inputs. The generated representation data may increase the amount of samples, data, and/or a size of a knowledge graph to increase accuracy in identifying objects within data inputs and/or substantially prevent errors associated with incorrectly identifying objects in the data. Accordingly, some implementations described herein may conserve processor resources and/or memory resources that may otherwise be wasted on improperly identifying objects and/or topics associated with data inputs.

As indicated above, FIGS. 1A-1D are provided merely as an example. Other examples are possible and may differ from what was described with regard to FIGS. 1A-1D.

FIG. 2 is a diagram of an example environment 200 in which systems and/or methods, described herein, may be implemented. As shown in FIG. 2, environment 200 may include a user device 205, a data generation platform 210, a computing resource 215, a cloud computing environment 220, and a network 230. Devices of environment 200 may interconnect via wired connections, wireless connections, or a combination of wired and wireless connections.

User device 205 includes one or more devices capable of receiving, generating, storing, processing, and/or providing information associated with generating data associated with underrepresented data based on a received data input. For example, user device 205 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Data generation platform 210 includes one or more devices capable of receiving, generating, storing, processing, and/or providing information associated with generating data associated with underrepresented data based on a received data input. According to some implementations, data generation platform 210 may be associated with and/or include one or more of the knowledge graph data structure, the semantic representation analyzer, the topic score calculator, the class balance identifier, the representation threshold analyzer, the representation data generator, or the data generation platform of example implementation 100 of FIGS. 1A-1D. As such, data generation platform 210 may be capable of receiving an input, identifying objects within the input, determine that one or more classes of the objects are underrepresented, and generate data to provide and/or data samples for the class to increase the representation of those particular classes.

In some implementations, data generation platform 210 may be included within a system (e.g., a machine learning system, a classification system, a data analysis system, and/or the like) that is capable of analyzing data inputs and processing the data inputs based on a reference set of data and/or reference knowledge graphs. Accordingly, in some implementations, when data generation platform 210 determines that a data set associated with a received data input is underrepresented, data generation platform 210 may perform one or more of the processes described herein to generate representation data for the data set.

Data generation platform 210 may include a server device or a group of server devices. In some implementations, data generation platform 210 may be hosted in cloud computing environment 220. Notably, while implementations described herein describe data generation platform 210 as being hosted in cloud computing environment 220, in some implementations, data generation platform 210 may not be cloud-based or may be partially cloud-based.

Cloud computing environment 220 includes an environment that delivers computing as a service, whereby shared resources, services, etc. may be provided to user device 205 and/or any other device in communication with cloud computing environment. Cloud computing environment 220 may provide computation, software, data access, storage, and/or other services that do not require end-user knowledge of a physical location and configuration of a system and/or a device that delivers the services. As shown, cloud computing environment 220 may include data generation platform and computing resource 215.

Computing resource 215 includes one or more personal computers, workstation computers, server devices, or another type of computation and/or communication device. In some implementations, computing resource 215 may host data generation platform. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 205. Application 215-1 may eliminate a need to install and execute the software applications on user device 205. For example, application 215-1 may include software associated with data generation platform and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., user device 205), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
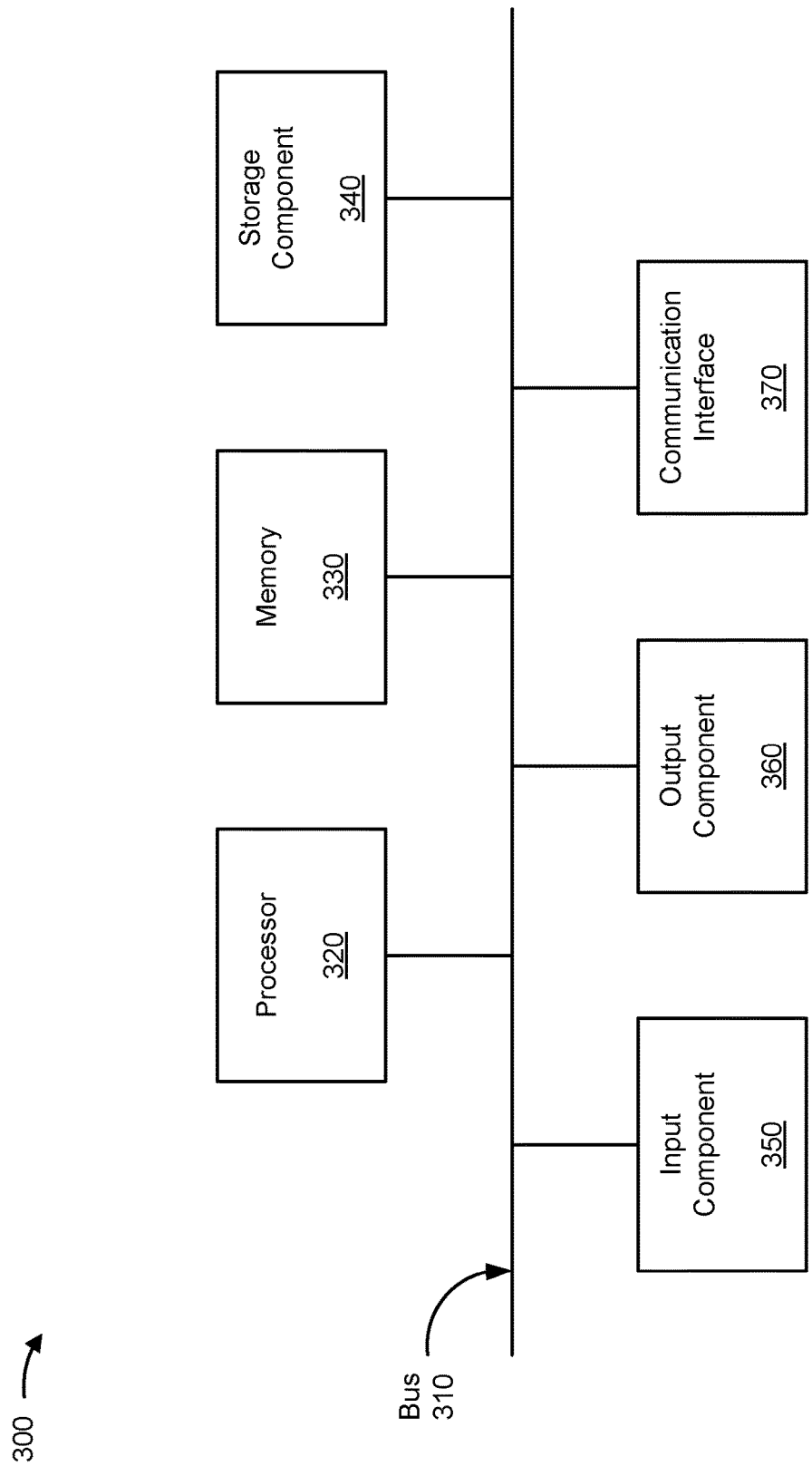
FIG. 3 is a diagram of example components of one or more devices of FIG. 2.

FIG. 3 is a diagram of example components of a device 300. Device 300 may correspond to user device 205, data generation platform 210, and/or computing resource 215. In some implementations, user device 205, data generation platform 210, and/or computing resource 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
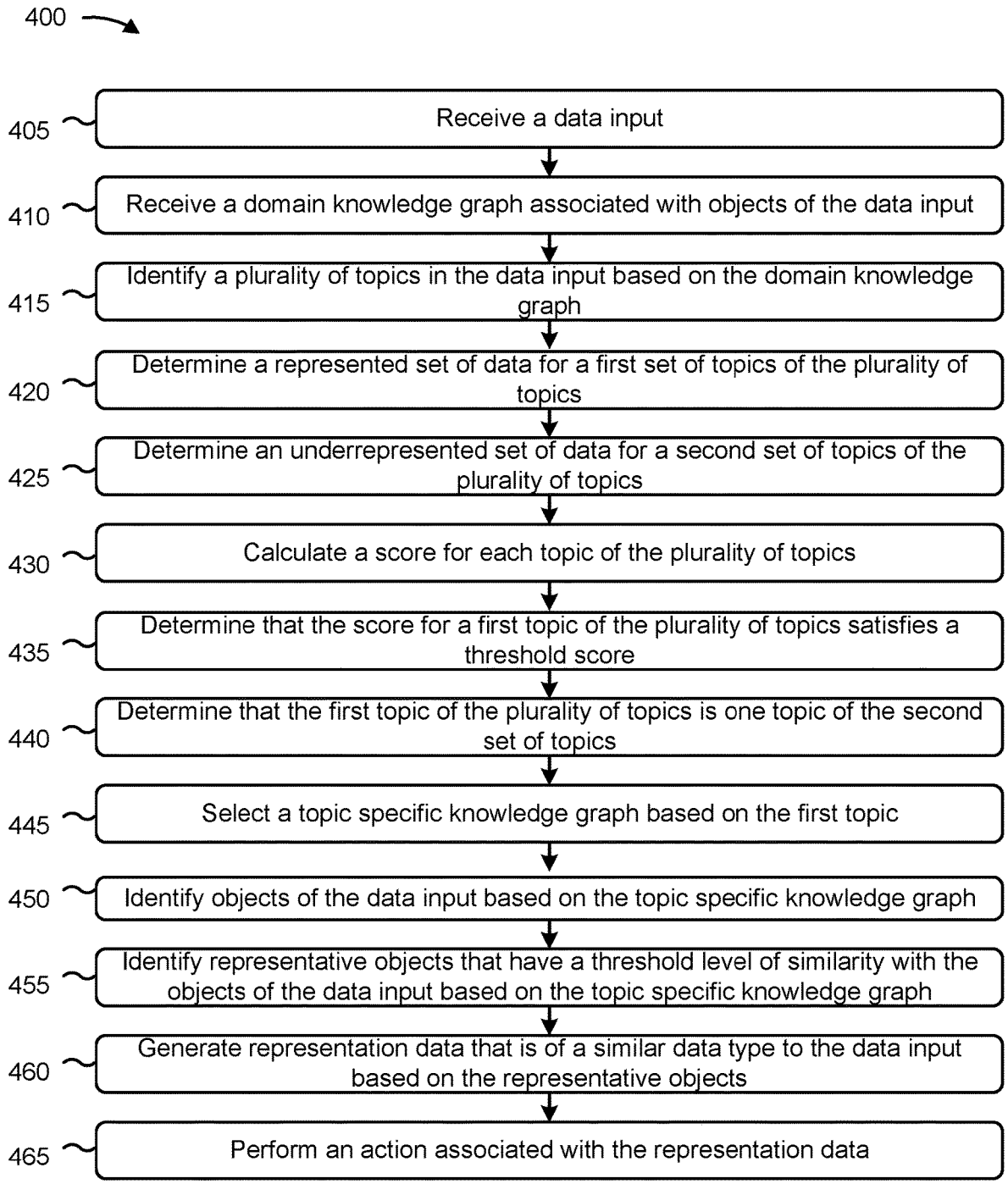
FIG. 4 is a flow chart of an example process for generating data associated with underrepresented data based on a received data input.

FIG. 4 is a flow chart of an example process 400 for generating data associated with underrepresented data based on a received data input. In some implementations, one or more process blocks of FIG. 4 may be performed by a data generation platform (e.g., data generation platform 210). In some implementations, one or more process blocks of FIG. 4 may be performed by another device or a group of devices separate from or including the data generation platform (e.g., data generation platform 210), such as a user device (e.g., user device 205).

As shown in FIG. 4, process 400 may include receiving a data input (block 405). For example, the data generation platform (e.g., using computing resource 215, processor 320, memory 330, input component 350, communication interface 370, and/or the like) may receive data input, as described above.

As further shown in FIG. 4, process 400 may include receiving a domain knowledge graph associated with objects of the data input (block 410). For example, the data generation platform (e.g., using computing resource 215, processor 320, memory 330, input component 350, communication interface 370, and/or the like) may receive a domain knowledge graph associated with objects of the data input, as described above.

As further shown in FIG. 4, process 400 may include identifying a plurality of topics in the data input based on the domain knowledge graph (block 415). For example, the data generation platform (e.g., using computing resource 215, processor 320, memory 330, and/or the like) may identify a plurality of topics in the data input based on the domain knowledge graph, as described above.

As further shown in FIG. 4, process 400 may include determining a represented set of data for a first set of topics of the plurality of topics based on a representative learning technique (block 420). For example, the data generation platform (e.g., using computing resource 215, processor 320, memory 330, and/or the like) may determine a represented set of data for a first set of topics of the plurality of topics based on a representative learning technique, as described above.

As further shown in FIG. 4, process 400 may include determining an underrepresented set of data for a second set of topics of the plurality of topics based on the representative learning technique (block 425). For example, the data generation platform (e.g., using computing resource 215, processor 320, memory 330, and/or the like) may determine an underrepresented set of data for a second set of topics of the plurality of topics based on the representative learning technique, as described above.

As further shown in FIG. 4, process 400 may include calculating a score for each topic of the plurality of topics based on the representative learning technique (block 430). For example, the data generation platform (e.g., using computing resource 215, processor 320, memory 330, and/or the like) may calculate a score for each topic of the plurality of topics based on the representative learning technique, as described above.

As further shown in FIG. 4, process 400 may include determining that the score for a first topic of the plurality of topics satisfies a threshold score (block 435). For example, the data generation platform (e.g., using computing resource 215, processor 320, memory 330, and/or the like) may determine that the score for a first topic of the plurality of topics satisfies a threshold score, as described above.

As further shown in FIG. 4, process 400 may include determining that the first topic of the plurality of topics is one topic of the second set of topics (block 440). For example, the data generation platform (e.g., using computing resource 215, processor 320, memory 330, and/or the like) may determine that the first topic of the plurality of topics is one topic of the second set of topics, as described above.

As further shown in FIG. 4, process 400 may include selecting a topic specific knowledge graph based on the first topic (block 445). For example, the data generation platform (e.g., using computing resource 215, processor 320, memory 330, and/or the like) may select a topic specific knowledge graph based on the first topic, as described above.

As further shown in FIG. 4, process 400 may include identifying objects of the data input based on the topic specific knowledge graph (block 450). For example, the data generation platform (e.g., using computing resource 215, processor 320, memory 330, and/or the like) may objects of the data input based on the topic specific knowledge graph, as described above.

As further shown in FIG. 4, process 400 may include identifying representative objects that have a threshold level of similarity with the objects of the data input based on the topic specific knowledge graph (block 455). For example, the data generation platform (e.g., using computing resource 215, processor 320, memory 330, and/or the like) may identify representative objects that have a threshold level of similarity with the objects of the data input based on the topic specific knowledge graph, as described above.

As further shown in FIG. 4, process 400 may include generating representation data that is of a similar data type to the data input based on the representative objects (block 460). For example, the data generation platform (e.g., using computing resource 215, processor 320, memory 330, and/or the like) representation data that is of a similar data type to the data input based on the representative objects, as described above.

As further shown in FIG. 4, process 400 may include performing an action associated with the representation data (block 465). For example, the data generation platform (e.g., using computing resource 215, processor 320, memory 330, storage component 340, communication interface 370, and/or the like) may perform an action associated with the representation data, as described above.

Process 400 may include additional implementations, such as any single implementation or any combination of implementations described below and/or in connection with one or more other processes described elsewhere herein.

In some implementations, the data generation platform may identify the objects of the data input by comparing the objects of the data input to objects of a knowledge graph data structure. In some implementations, the knowledge graph data structure includes the domain knowledge graph. In some implementations, the data generation platform, when determining the underrepresented set of data for the second set of topics, may determine that the underrepresented set of data for the second set of topics is underrepresented relative to the represented set of data for the first set of topics. In some implementations, the data generation platform, when determining the underrepresented set of data for the second set of topics, may determine that the underrepresented set of data for the second set of topics is underrepresented relative to the plurality of topics.

In some implementations, the data generation platform, when generating the representation data, may mapping the representative objects to the objects of the data input based on the topic specific knowledge graph and substitute at least one of the representative objects with at least one of the objects of the data input to generate the representation data. In some implementations, the data generation platform, when mapping the representative objects of the data input, may identify an organizational structure of the objects of the data input, identify a characteristic of each of the objects of the data input, and map the representative objects to the objects of the data input based on the organizational structure and the characteristic of each of the objects according to the topic specific knowledge graph.

In some implementations, the data generation platform, when performing the action, may generating a representation knowledge graph based on the representation data. In some implementations, the representation knowledge graph includes a new topic that is associated with the underrepresented set of data. In some implementations, the data generation platform may store the representation knowledge graph in a knowledge graph data structure. In some implementations, the knowledge graph data structure stores the domain knowledge graph and the topic specific knowledge graph.

In some implementations, the data input may include at least one of text data or image data. In some implementations, the data generation platform may convert the topic specific knowledge graph into an embedding space. In some implementations, the objects of the data input are identified in the embedding space and the representative objects are identified in the embedding space.

In some implementations, the represented set of data is determined using a representative learning technique. In some implementations, the underrepresented set of data is determined using a representative learning technique. In some implementations, the score is calculated using a representative learning technique.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
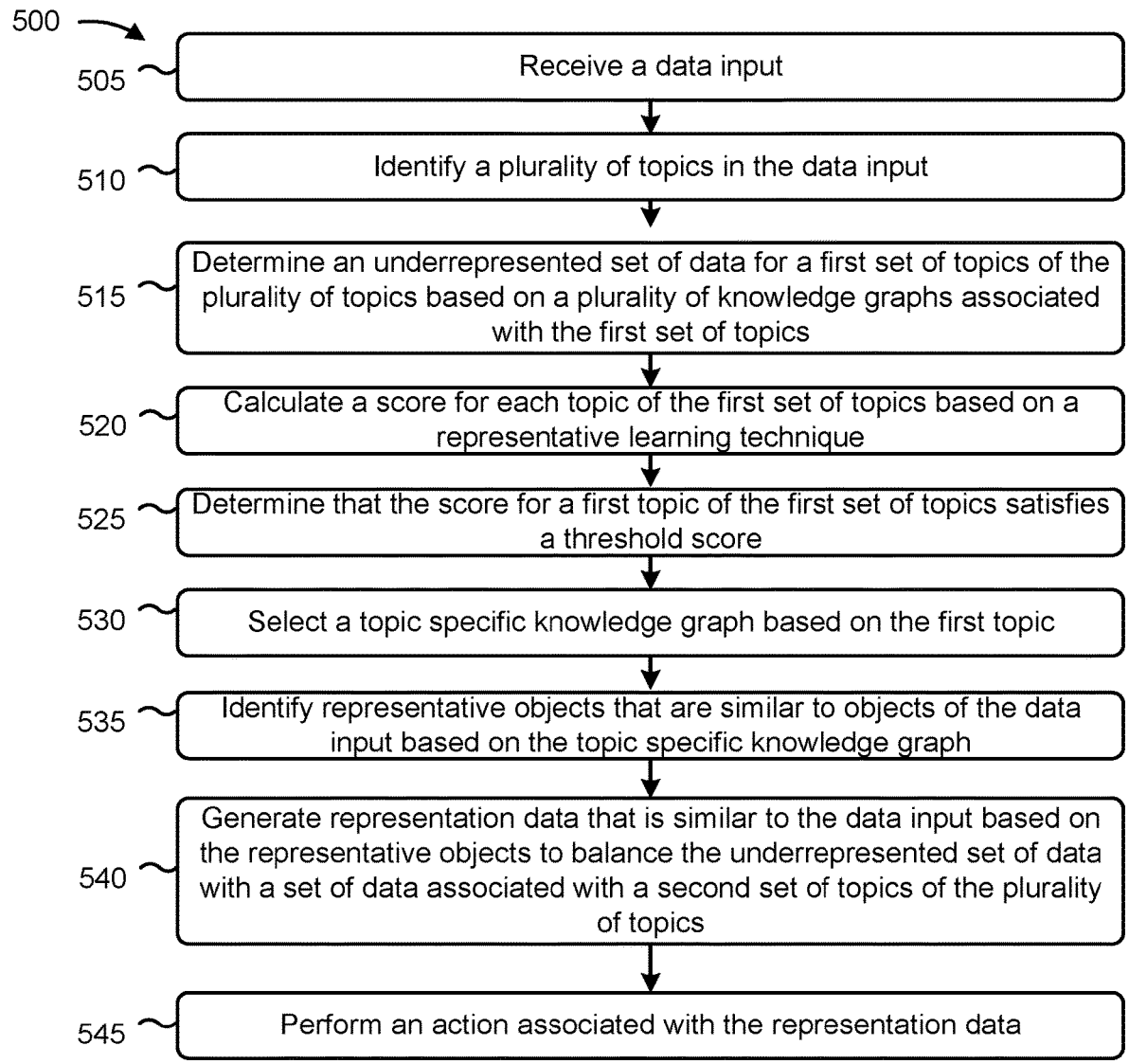
FIG. 5 is a flow chart of an example process for generating data associated with underrepresented data based on a received data input.

FIG. 5 is a flow chart of an example process 500 for generating data associated with underrepresented data based on a received data input. In some implementations, one or more process blocks of FIG. 5 may be performed by a data generation platform (e.g., data generation platform 210). In some implementations, one or more process blocks of FIG. 5 may be performed by another device or a group of devices separate from or including the data generation platform (e.g., data generation platform 210), such as a user device (e.g., user device 205).

As shown in FIG. 5, process 500 may include receiving a data input (block 505). For example, the data generation platform (e.g., using computing resource 215, processor 320, memory 330, input component 350, communication interface 370, and/or the like) may receive a data input, as described above.

As further shown in FIG. 5, process 500 may include identifying a plurality of topics in the data input (block 510). For example, the data generation platform (e.g., using computing resource 215, processor 320, memory 330, and/or the like) may identify a plurality of topics in the data input, as described above.

As further shown in FIG. 5, process 500 may include determining an underrepresented set of data for a first set of topics of the plurality of topics based on a plurality of knowledge graphs associated with the set of topics (block 515). For example, the data generation platform (e.g., using computing resource 215, processor 320, memory 330, and/or the like) may determine an underrepresented set of data for a first set of topics of the plurality of topics based on a plurality of knowledge graphs associated with the set of topics, as described above.

As further shown in FIG. 5, process 500 may include calculating a score for each topic of the first set of topics based on a representative learning technique (block 520). For example, the data generation platform (e.g., using computing resource 215, processor 320, memory 330, and/or the like) may calculate a score for each topic of the first set of topics based on a representative learning technique, as described above.

As further shown in FIG. 5, process 500 may include determining that the score for a first topic of the first set of topics satisfies a threshold score (block 525). For example, the data generation platform (e.g., using computing resource 215, processor 320, memory 330, and/or the like) may determine that the score for a first topic of the first set of topics satisfies a threshold score, as described above.

As further shown in FIG. 5, process 500 may include selecting a topic specific knowledge graph based on the first topic (block 530). For example, the data generation platform (e.g., using computing resource 215, processor 320, memory 330, and/or the like) may select a topic specific knowledge graph based on the first topic, as described above.

As further shown in FIG. 5, process 500 may include identifying representative objects that are similar to objects of the data input based on the topic specific knowledge graph (block 535). For example, the data generation platform (e.g., using computing resource 215, processor 320, memory 330, and/or the like) may identify representative objects that are similar to objects of the data input based on the topic specific knowledge graph, as described above.

As further shown in FIG. 5, process 500 may include generating representation data that is similar to the data input based on the representative objects to balance the underrepresented set of data with a set of data associated with a second set of topics of the plurality of topics (block 540). For example, the data generation platform (e.g., using computing resource 215, processor 320, memory 330, and/or the like) may generate representation data that is similar to the data input based on the representative objects to balance the underrepresented set of data with a set of data associated with a second set of topics of the plurality of topics, as described above.

As further shown in FIG. 5, process 500 may include performing an action associated with the representation data (block 545). For example, the data generation platform (e.g., using computing resource 215, processor 320, memory 330, output component 360, communication interface 370, and/or the like) may perform an action associated with the representation data, as described above.

Process 500 may include additional implementations, such as any single implementation or any combination of implementations described below and/or in connection with one or more other processes described elsewhere herein.

In some implementations, the data generation platform, when determining the underrepresented set of data, may determine the underrepresented set of data is underrepresented relative to the set of data associated with the second set of topics. In some implementations, the score indicates a degree of a similarity between each topic of the first set of topics and a domain knowledge graph obtained via the representative learning technique. In some implementations, the data generation platform, when identifying the representative objects that are similar to the objects of the data input, may map the representative objects to the objects of the data input based on characteristics of the representative objects, characteristics of the objects, and positions of the representative objects within the topic specific knowledge graph.

In some implementations, the data generation platform, when generating the representation data, may identify an organizational structure of the objects of the data input, identify a characteristic of each of the objects of the data input, map the representative objects to the objects of the data input based on the organizational structure and the characteristic of each of the objects according to the topic specific knowledge graph, and substitute at least one of the representative objects with at least one of the objects of the data input to generate the representation data.

In some implementations, the data generation platform may encode the data input based on a domain knowledge graph to identify the objects of the data input. In some implementations, the data generation platform, when performing the action, may generate a representation knowledge graph based on the representation data. In some implementations, the representation knowledge graph includes a new topic that is associated with the underrepresented set of data. In some implementations, the data generation platform, when performing the action, may store the representation knowledge graph in a knowledge graph data structure. In some implementations, the knowledge graph data structure stores the plurality of knowledge graphs and the topic specific knowledge graph.

Although FIG. 5 shows example blocks of process 400, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
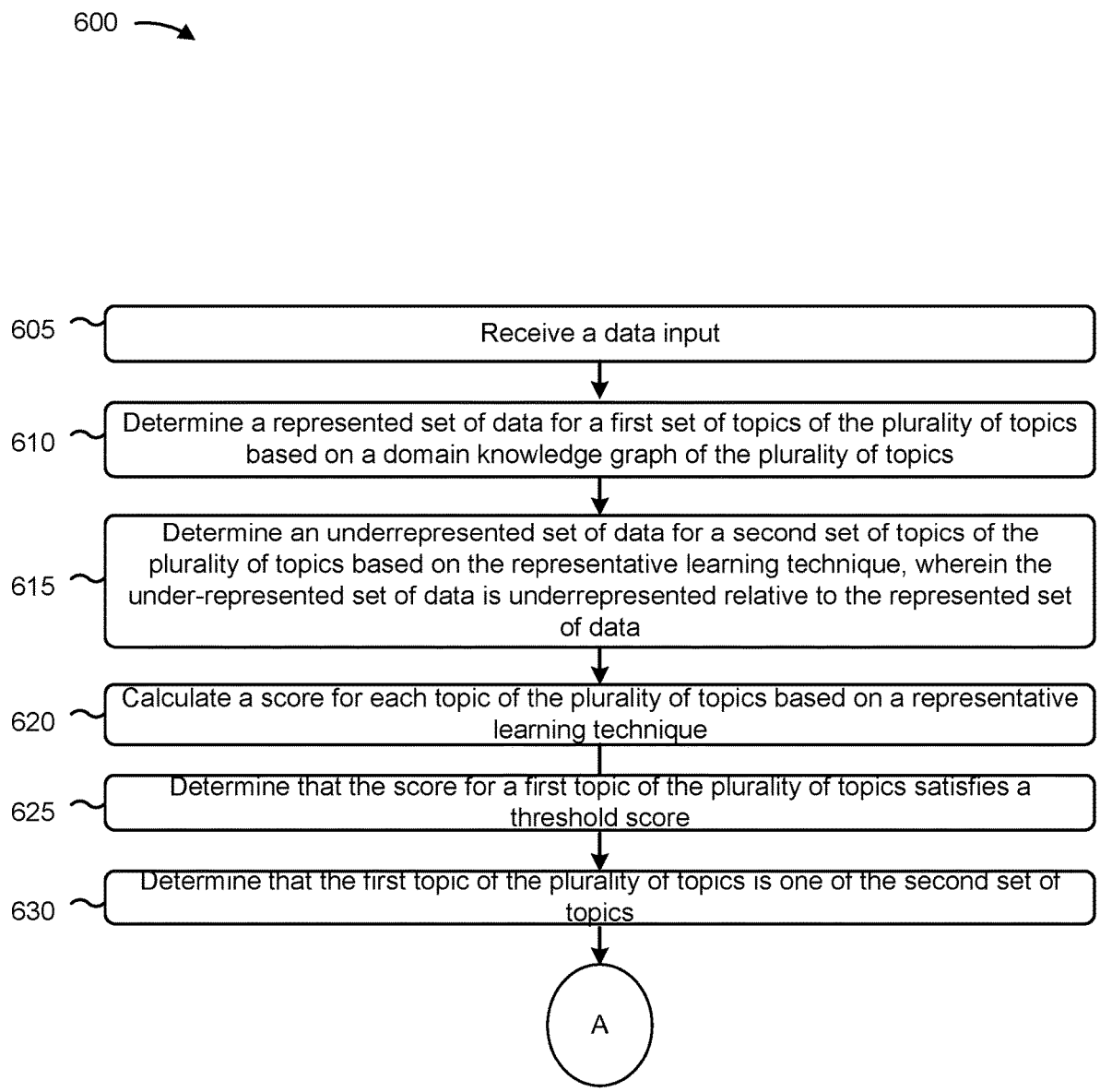
FIGS. 6A and 6B include a flow chart of an example process for generating data associated with underrepresented data based on a received data input.
Figure 6B:
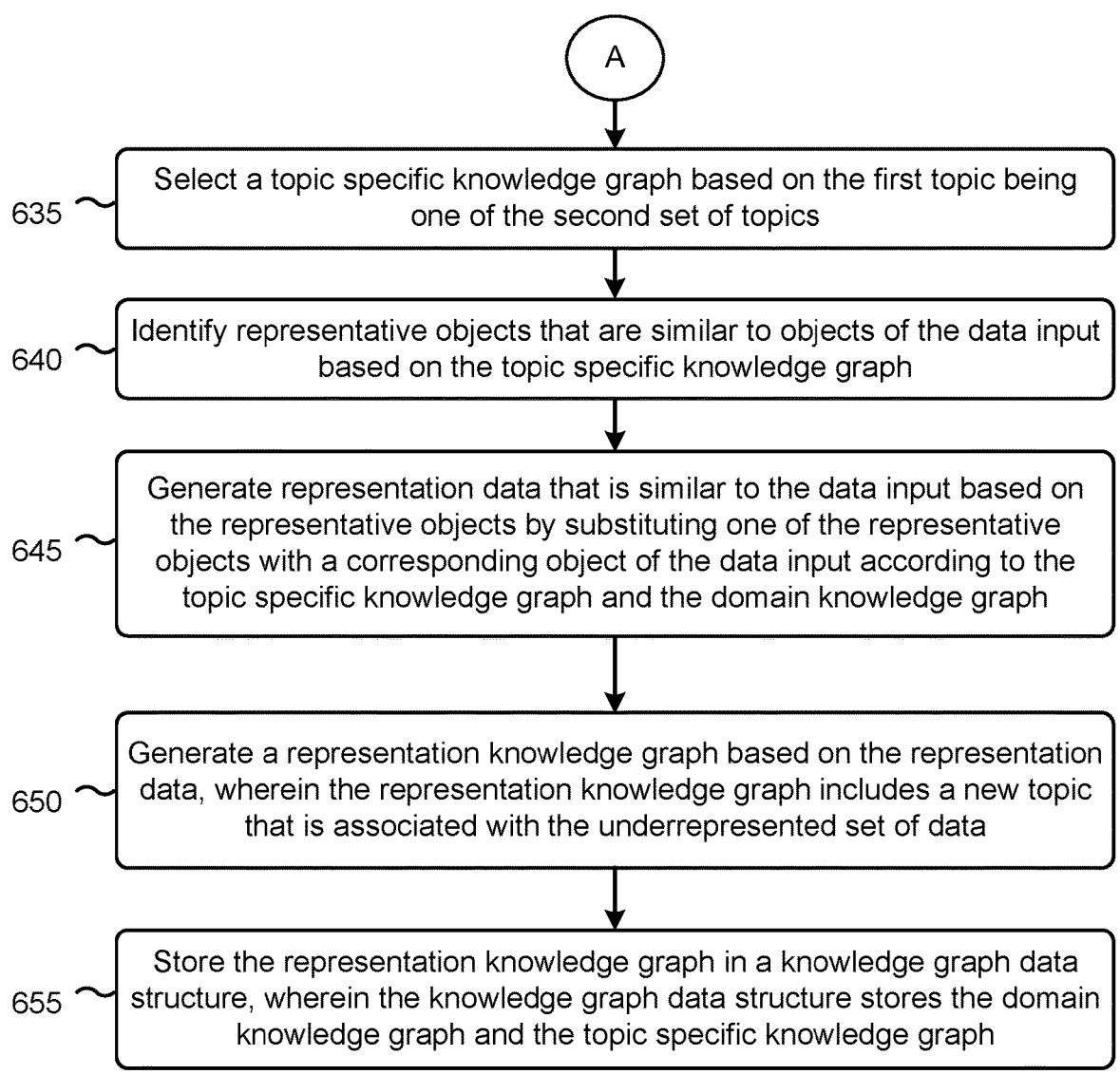

FIGS. 6A and 6B includes a flow chart of an example process 600 for generating data associated with underrepresented data based on a received data input. In some implementations, one or more process blocks of FIGS. 6A and 6B may be performed by a data generation platform (e.g., data generation platform 210). In some implementations, one or more process blocks of FIGS. 6A and 6B may be performed by another device or a group of devices separate from or including the data generation platform (e.g., data generation platform 210), such as a user device (e.g., user device 205).

As shown in FIG. 6A, process 600 may include receiving a data input (block 605). For example, the data generation platform (e.g., using computing resource 215, processor 320, memory 330, input component 350, communication interface 370, and/or the like) may receive the data input, as described above.

As further shown in FIG. 6A, process 600 may include determining a represented set of data for a first set of topics of the plurality of topics based on a domain knowledge graph of the plurality of topics (block 610). For example, the data generation platform (e.g., using computing resource 215, processor 320, memory 330, and/or the like) may determine a represented set of data for a first set of topics of the plurality of topics based on a domain knowledge graph of the plurality of topics, as described above.

As further shown in FIG. 6A, process 600 may include determining an underrepresented set of data for a second set of topics of the plurality of topics based on the representative learning technique, wherein the underrepresented set of data is underrepresented relative to the represented set of data (block 615). For example, the data generation platform (e.g., using computing resource 215, processor 320, memory 330, and/or the like) may determine an underrepresented set of data for a second set of topics of the plurality of topics based on the representative learning technique, as described above. In some implementations, the underrepresented set of data is underrepresented relative to the represented set of data.

As further shown in FIG. 6A, process 600 may include calculating a score for each topic of the plurality of topics based on a representative learning technique (block 620). For example, the data generation platform (e.g., using computing resource 215, processor 320, memory 330, and/or the like) may calculate a score for each topic of the plurality of topics based on a representative learning technique, as described above.

As further shown in FIG. 6A, process 600 may include determining that the score for a first topic of the plurality of topics satisfies a threshold score (block 625). For example, the data generation platform (e.g., using computing resource 215, processor 320, memory 330, and/or the like) may determine that the score for a first topic of the plurality of topics satisfies a threshold score, as described above.

As further shown in FIG. 6A, process 600 may include determining that the first topic of the plurality of topics is one of the second set of topics (block 630). For example, the data generation platform (e.g., using computing resource 215, processor 320, memory 330, and/or the like) may determine that the first topic of the plurality of topics is one of the second set of topics, as described above.

As further shown in FIG. 6B, process 600 may include selecting a topic specific knowledge graph based on the first topic being one of the second set of topics (block 635). For example, the data generation platform (e.g., using computing resource 215, processor 320, memory 330, and/or the like) may select a topic specific knowledge graph based on the first topic being one of the second set of topics, as described above.

As further shown in FIG. 6B, process 600 may include identifying representative objects that are similar to objects of the data input based on the topic specific knowledge graph (block 640). For example, the data generation platform (e.g., using computing resource 215, processor 320, memory 330, and/or the like) may identify representative objects that are similar to objects of the data input based on the topic specific knowledge graph, as described above.

As further shown in FIG. 6B, process 600 may include generating representation data that is similar to the data input based on the representative objects by substituting one of the representative objects with a corresponding object of the data input according to the topic specific knowledge graph and the domain knowledge graph (block 645). For example, the data generation platform (e.g., using computing resource 215, processor 320, memory 330, and/or the like) may generate representation data that is similar to the data input based on the representative objects by substituting one of the representative objects with a corresponding object of the data input according to the topic specific knowledge graph and the domain knowledge graph, as described above.

As further shown in FIG. 6B, process 600 may include generating a representation knowledge graph based on the representation data, wherein the representation knowledge graph includes a new topic that is associated with the underrepresented set of data (block 650). For example, the data generation platform (e.g., using computing resource 215, processor 320, memory 330, and/or the like) may generate a representation knowledge graph based on the representation data, as described above. In some implementations, the representation knowledge graph includes a new topic that is associated with the underrepresented set of data.

As further shown in FIG. 6B, process 600 may include storing the representation knowledge graph in a knowledge graph data structure, wherein the knowledge graph data structure stores the domain knowledge graph and the topic specific knowledge graph (block 655). For example, the data generation platform (e.g., using computing resource 215, processor 320, memory 330, storage component 340, and/or the like) may store the representation knowledge graph in a knowledge graph data structure, as described above. In some implementations, the knowledge graph data structure stores the domain knowledge graph and the topic specific knowledge graph.

Process 600 may include additional implementations, such as any single implementation or any combination of implementations described below and/or in connection with one or more other processes described elsewhere herein.

In some implementations, the data generation platform may identify the plurality of topics of the data input and obtain the domain knowledge graph based on the plurality of topics. In some implementations, the underrepresented set of data is underrepresented relative to the represented set of data based on an amount of data associated with the underrepresented set of data, that is included in the knowledge graph data structure, satisfying a threshold percentage of an amount of the set of represented data In some implementations, the data generation platform, when generating the representation, may identify an organizational structure of the objects of the data input, identify a characteristic of each of the objects of the data input, and map the representative objects to the objects of the data input based on the organizational structure and the characteristic of each of the objects according to the topic specific knowledge graph. In some implementations, the knowledge graph data structure stores the domain knowledge graph and the topic specific knowledge graph. In some implementations, the score indicates a degree of a similarity between each topic of the first set of topics and the domain knowledge graph. In some implementations, the domain knowledge graph is obtained via the representative learning technique.

Although FIGS. 6A and 6B show example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

As described herein, a data generation platform 210 may be used to generate data for underrepresented data sets associated with particular topics. Data generation platform 210 may identify topics within a data input based on a domain knowledge graph, determine which topics of the data input are underrepresented, and generate data associated with the topics that are underrepresented using the data input. Accordingly, some implementations described herein may conserve processor resources and/or memory resources that may otherwise be spent attempting to process or identify topics that have underrepresented sets of data. Furthermore, some implementations described herein can conserve processor resources and/or memory resources associated with correcting detections and/or analyses associated with underrepresented topics that were inaccurate as a result of using underrepresented data sets.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a data input;
   receiving, by the device, a domain knowledge graph associated with objects of the data input;
   identifying, by the device, a plurality of topics in the data input based on the domain knowledge graph;
   determining, by the device, a represented set of data for a first set of topics of the plurality of topics;
   determining, by the device, an underrepresented set of data for a second set of topics of the plurality of topics, the underrepresented set of data being determined using a representative learning technique, and
   the representative learning technique being machine learning;
   determining, by the device, a distance between an identified topic of the data input and a first topic in the domain knowledge graph;
   calculating, by the device, a score for the first topic based on the distance;
   determining, by the device, that the score for the first topic satisfies a threshold score;
   determining, by the device and based on determining that the score for the first topic satisfies the threshold score, that the first topic of the plurality of topics is one topic of the second set of topics;
   selecting, by the device, a topic specific knowledge graph based on the first topic;
   identifying, by the device, objects of the data input based on a sentence structure of the data input and based on the topic specific knowledge graph;
   identifying, by the device, representative objects that have a threshold level of similarity with the objects of the data input based on the topic specific knowledge graph,
   wherein identifying the representative objects that are similar to the objects of the data input comprises:
      mapping the representative objects to the objects of the data input based on characteristics of the representative objects, characteristics of the objects, and positions of the representative objects within the topic specific knowledge graph;
   generating, by the device and based on the representative objects, representation data that is of a similar part of speech as the objects of the data input and increases an amount of data associated with the underrepresented set of data,
   the part of speech being a noun, verb, adjective, adverb, or preposition, and generating the representation data comprising:
      identifying an organizational structure of the objects of the data input,
      identifying a characteristic of each of the objects of the data input,
      mapping the representative objects to the objects of the data input based on the organizational structure and the characteristic of each of the objects according to the topic specific knowledge graph, and
      substituting a representative object, of the representative objects, for an object, of the objects of the data input, based on an edge distance of the representative object from the object of the data input in the topic specific knowledge graph; and performing, by the device, an action associated with the representation data.

2. The method of claim 1, further comprising:
identifying the objects of the data input by comparing the objects of the data input to objects of a knowledge graph data structure,
wherein the knowledge graph data structure includes the domain knowledge graph.

3. The method of claim 1, wherein determining the underrepresented set of data for the second set of topics comprises:
determining that the underrepresented set of data for the second set of topics is underrepresented relative to the represented set of data for the first set of topics.

4. The method of claim 1, wherein determining the underrepresented set of data for the second set of topics comprises:
determining that the underrepresented set of data for the second set of topics is underrepresented relative to the plurality of topics.

5. The method of claim 1, wherein performing the action comprises:
generating a representation knowledge graph based on the representation data,
wherein the representation knowledge graph includes a new topic that is associated with the underrepresented set of data.

6. The method of claim 1, further comprising:
converting the topic specific knowledge graph into an embedding space,
wherein the objects of the data input are identified in the embedding space and the representative objects are identified in the embedding space.

7. The method of claim 1, wherein the represented set of data is determined using the representative learning technique.

8. The method of claim 1, wherein the score is calculated using the representative learning technique.

9. The method of claim 1, further comprising:
encoding the data input based on the domain knowledge graph to identify the objects of the data input.

10. The method of claim 1, wherein receiving the data input comprises:
subscribing to one or more sources to receive the data input from the one or more sources.

11. The method of claim 1, wherein receiving the domain knowledge graph associated with objects of the data input comprises:
obtaining the domain knowledge graph to identify topics associated with the data input,
the domain knowledge graph including a knowledge graph of topics of a particular domain, with each topic, of the topics, being a node on the domain knowledge graph, and edges between the topics corresponding to relationships between respective topics.

12. A device, comprising:
one or more memories; and
one or more processors, communicatively coupled to the one or more memories, to:
receive a data input;
identify a plurality of topics in the data input;
determine an underrepresented set of data for a first set of topics of the plurality of topics based on a plurality of knowledge graphs associated with the first set of topics,
the underrepresented set of data being determined using a representative learning technique, and
the representative learning technique being machine learning;
determine a distance between an identified topic of the data input and a first topic in a domain knowledge graph;
calculate a score for the first topic based on the distance;
determine that the score for the first topic satisfies a threshold score;
select a topic specific knowledge graph based on the first topic;
identify objects of the data input based on a sentence structure of the data input;
identify representative objects that are similar to the objects of the data input based on the topic specific knowledge graph,
wherein the one or more processors, when identifying the representative objects, are to:
map the representative objects to the objects of the data input based on characteristics of the representative objects, characteristics of the objects, and positions of the representative objects within the topic specific knowledge graph;
generate, based on the representative objects, representation data that is of a similar part of speech as the objects of to the data input to balance the underrepresented set of data with a set of data associated with a second set of topics of the plurality of topics and increase an amount of data associated with the underrepresented set of data,
wherein the part of speech is a noun, verb, adjective, adverb, or preposition, and
wherein the one or more processors, when generating the representation data, are to:
identify an organizational structure of the objects of the data input;
identify a characteristic of each of the objects of the data input;
map the representative objects to the objects of the data input based on the organizational structure and the characteristic of each of the objects according to the topic specific knowledge graph; and
substitute a representative object, of the representative objects, for an object, of the objects of the data input, based on an edge distance of the representative object from the object of the data input in the topic specific knowledge graph; and
perform an action associated with the representation data.

13. The device of claim 12, wherein the one or more processors, when determining the underrepresented set of data, are to:
determine the underrepresented set of data is underrepresented relative to the set of data associated with the second set of topics.

14. The device of claim 12, wherein the score indicates a degree of a similarity between each topic of the first set of topics and a domain knowledge graph.

15. The device of claim 12, wherein the one or more processors are further to:
encode the data input based on a domain knowledge graph to identify the objects of the data input.

16. The device of claim 12, wherein the one or more processors, when performing the action, are to:
  generate a representation knowledge graph based on the representation data,
    wherein the representation knowledge graph includes a new topic that is associated with the underrepresented set of data; and
  store the representation knowledge graph in a knowledge graph data structure,
    wherein the knowledge graph data structure stores the plurality of knowledge graphs and the topic specific knowledge graph.

17. The device of claim 12, wherein the one or more processors are further to:
  convert the topic specific knowledge graph into an embedding space,
    wherein the objects of the data input are identified in the embedding space and the representative objects are identified in the embedding space.

18. The device of claim 12, wherein the one or more processors, when receiving the domain knowledge graph associated with objects of the data input, are to:
  obtain the domain knowledge graph to identify topics associated with the data input,
    the domain knowledge graph including a knowledge graph of topics of a particular domain, with each topic, of the topics, being a node on the domain knowledge graph, and edges between the topics corresponding to relationships between respective topics.

19. A non-transitory computer-readable medium storing instructions, the instructions comprising:
  one or more instructions that, when executed by one or more processors, cause the one or more processors to:
    receive a data input;
    determine a represented set of data for a first set of topics of a plurality of topics of the data input based on a domain knowledge graph of the plurality of topics;
    determine an underrepresented set of data for a second set of topics of the plurality of topics based on a representative learning technique,
      wherein the underrepresented set of data is underrepresented relative to the represented set of data, and
      wherein the representative learning technique is machine learning;
    determine a distance between an identified topic of the data input and a first topic in the domain knowledge graph;
    calculate a score for the first topic based on the distance;
    determine that the score for the first topic satisfies a threshold score;
    determine that the first topic of the plurality of topics is one of the second set of topics;
    select a topic specific knowledge graph based on the first topic being one of the second set of topics;
    identify objects of the data input based on a sentence structure of the data input;
    identify representative objects that are similar to the objects of the data input based on the topic specific knowledge graph,
      wherein the one or more instructions to identify the representative objects cause the one or more processors to:
        map the representative objects to the objects of the data input based on characteristics of the representative objects, characteristics of the objects, and positions of the representative objects within the topic specific knowledge graph;
    generate, based on the representative objects, representation data that is of similar part of speech to the objects of the data input and increases an amount of data associated with the underrepresented set of data,
      wherein the part of speech is a noun, a verb, an adverb, and adjective, or preposition, and
      wherein the one or more instructions to generate the representation data cause the one or more processors to:
        identify an organizational structure of the objects of the data input,
        identify a characteristic of each of the objects of the data input,
        map the representative objects to the objects of the data input based on the organizational structure and the characteristic of each of the objects according to the topic specific knowledge graph, and
        substitute one of the representative objects for a corresponding object of the data input based on an edge distance of the one of the representative objects from the object of the data input in the topic specific knowledge graph;
    generate a representation knowledge graph based on the representation data,
      wherein the representation knowledge graph includes a new topic that is associated with the underrepresented set of data; and
    store the representation knowledge graph in a knowledge graph data structure,
      wherein the knowledge graph data structure stores the domain knowledge graph and the topic specific knowledge graph.

20. The non-transitory computer readable medium of claim 19, where the one or more instructions that further cause the one or more processors to:
  convert the topic specific knowledge graph into an embedding space,
    wherein the objects of the data input are identified in the embedding space and the representative objects are identified in the embedding space.

* * * * *